(12) United States Patent
Bohlke et al.

(10) Patent No.: US 7,931,177 B2
(45) Date of Patent: *Apr. 26, 2011

(54) STORAGE CONTAINER FOR USE IN A BOOT

(75) Inventors: Hartmut Bohlke, Wuppertal (DE); Olaf Bueschgens, Willich (DE); Andreas Goebbels, Kuerten (DE); Wolfgang Sitzler, Wuppertal (DE); Werner P. Schlecht, Vaihingen (DE); Juergen Salewski, Duesseldorf (DE)

(73) Assignee: Bos GmbH & Co. KG, Ostfildern (DE)

( * ) Notice: Subject to any disclaimer, the term of this patent is extended or adjusted under 35 U.S.C. 154(b) by 787 days.

This patent is subject to a terminal disclaimer.

(21) Appl. No.: 11/893,128

(22) Filed: Aug. 14, 2007

(65) Prior Publication Data
US 2009/0045645 A1 Feb. 19, 2009

(51) Int. Cl.
*B60R 7/02* (2006.01)

(52) U.S. Cl. ........ 224/542; 224/281; 224/497; 224/543; 224/548; 224/563; 297/37.16

(58) Field of Classification Search .................. 224/281, 224/318, 42.34, 42.35, 42.36, 496, 497, 498, 224/499, 500, 542, 543, 546, 548, 549, 550, 224/563, 566, 925; 296/37.5; 410/117, 118; 414/304, 391, 416.09, 423, 539; 108/36; 220/666, 4.28
See application file for complete search history.

(56) References Cited

U.S. PATENT DOCUMENTS

| | | | |
|---|---|---|---|
| 3,310,089 A * | 3/1967 | Silverman | 312/35 |
| 4,502,674 A | 3/1985 | White et al. | |
| 5,152,440 A * | 10/1992 | Chao | 224/549 |
| 5,207,260 A | 5/1993 | Commesso | |
| 5,971,433 A | 10/1999 | Ament et al. | |
| 6,390,526 B1 | 5/2002 | Ament et al. | |
| 6,406,083 B2 | 6/2002 | Bharj et al. | |
| 6,439,633 B2 | 8/2002 | Nemoto | |
| 6,598,921 B2 | 7/2003 | Seel et al. | |
| 6,715,525 B2 | 4/2004 | Ehrenberger et al. | |
| 7,028,872 B2 * | 4/2006 | Lobanoff | 224/497 |
| 7,048,319 B2 | 5/2006 | Ament et al. | |

(Continued)

FOREIGN PATENT DOCUMENTS

DE 198 58 194 A1 6/2000

(Continued)

OTHER PUBLICATIONS

German Patent Office Office Action dated Oct. 13, 2006 (2 pages).

(Continued)

*Primary Examiner* — Justin M Larson
*Assistant Examiner* — Steven M Landolfi, Jr.
(74) *Attorney, Agent, or Firm* — Flynn, Thiel, Boutell & Tanis, P.C.

(57) ABSTRACT

A storage container for use in a boot of a motor vehicle, which container is fastenable on the lower side of a rear parcel shelf and, for loading, is movable into at least one loading and/or unloading position, and which includes a frame, a supporting surface and at least one essentially inelastic side wall connecting the supporting surface to the frame, wherein the side wall can be deformed, and therefore the height of the storage container can be varied. A module for fitting a storage container in a vehicle is also included.

14 Claims, 10 Drawing Sheets

U.S. PATENT DOCUMENTS

| | | | |
|---|---|---|---|
| 7,121,601 B2 | 10/2006 | Mulvihill et al. | |
| 7,128,121 B2 * | 10/2006 | Nien | 160/121.1 |
| 7,255,382 B2 | 8/2007 | Ament et al. | |
| 7,318,617 B1 | 1/2008 | Scotton | |
| 7,537,257 B2 * | 5/2009 | Watanabe et al. | 296/24.46 |
| 7,762,602 B2 | 7/2010 | Bohlke et al. | |
| 2007/0164581 A1 | 7/2007 | Ehrenberger | |
| 2009/0134653 A1 | 5/2009 | Buehl et al. | |
| 2009/0167043 A1 | 7/2009 | Aebker | |

FOREIGN PATENT DOCUMENTS

| | | |
|---|---|---|
| DE | 101 17 837 A1 | 1/2002 |
| DE | 103 32 983 A1 | 2/2005 |
| DE | 10332983 A1 * | 2/2005 |
| DE | 103 48 890 A1 | 5/2005 |
| DE | 10 2005 051 732 A1 | 5/2007 |
| DE | 10 2006 006 665 A1 | 8/2007 |
| DE | 10 2006 013 974 A1 | 9/2007 |
| EP | 0 914 989 A2 | 5/1999 |
| EP | 1 332 919 A2 | 8/2003 |
| EP | 1 717 104 A1 | 11/2006 |
| FR | 2 743 035 | 7/1997 |
| FR | 2 876 641 | 4/2006 |
| JP | 60-222339 | 11/1985 |

OTHER PUBLICATIONS

European Patent Office Search Report dated Jul. 23, 2007 (3 pages).

* cited by examiner

STORAGE CONTAINER FOR USE IN A BOOT

FIELD OF THE INVENTION

The invention relates to a storage container for use in a boot of a motor vehicle, which container is fastenable on the lower side of a rear parcel shelf and, for loading, is movable into a loading and/or unloading position. The invention furthermore relates to a module for fitting a storage container in a motor vehicle.

BACKGROUND OF THE INVENTION

Storage containers in which relatively small or sensitive objects can be stored clearly and securely in a boot of a motor vehicle are generally known. In particular in larger saloon lines, a boot has a large depth which is not equally suitable for all objects. Storage containers for storing relatively small and/or sensitive objects can in this case significantly increase the useful value of the boot.

Storage containers of this type are fastened displaceably in a storage position, for example on the lower side of a rear parcel shelf and, for loading or unloading, can be pulled out into a loading or unloading position. As a rule, the storage containers are only used temporarily.

It is the object of the present invention to provide a temporarily usable storage container by means of which objects can be stored securely and which does not need much space when not in use.

This object is achieved by a storage container for use in a boot of a motor vehicle, which container is fastenable on the lower side of a rear parcel shelf and, for loading, is movable into a loading and/or unloading position, and which comprises a frame, a supporting surface and at least one essentially inelastic side wall connecting the supporting surface to the frame, wherein the side wall can be deformed, and therefore the height of the storage container can be varied.

The height and therefore the size of the storage container can be adjusted by the deformable side wall as a function of a use. As a result, when not in use, a minimal height of the storage container can be realized, with the latter protruding only insignificantly into the boot of the motor vehicle and therefore only insignificantly or not reducing the useful size of the boot when the storage container is not in use. The loading and/or unloading position is/are preferably selected in such a manner that the opening of the storage container protrudes at least partially into an opening of the boot, and therefore simple loading and/or unloading of the storage container is possible. By contrast, a storage position is preferably selected in such a manner that access to the boot, for example under the rear parcel shelf, is only slightly obstructed, if at all, by the storage container. The frame and the side wall can be formed integrally.

In a development of the invention, the storage container can be mounted displaceably in a boot. The storage container is, for example, a drawer which can be pulled out. The mounting takes place, for example, via guide rails which are arranged on the storage container and interact with complementary longitudinal guides on the vehicle. In other embodiments, the storage container is mounted rotatably or pivotably in the boot, for example by means of an essentially vertical axis of rotation.

In one embodiment of the invention, the supporting surface and/or the frame of the storage container is/are essentially rectangular and is/are connected to each other via at least two mutually opposite side walls. In other embodiments, round, oval, triangular, trapezoidal or other supporting surfaces are conceivable. In the case of a displaceable storage container, the frame preferably has at least two parallel sides in order to realize simple displaceability, for example by means of guide rails and associated longitudinal guides. According to one embodiment, in the case of a pivotable arrangement, a round frame and a round supporting surface are provided. The shape of the storage container can be defined as a function of a size and/or constructional shape of the boot. In one embodiment, the storage container reaches over the entire width of an opening of the boot. By contrast, in other embodiments, the storage container takes up only a small part of the width of the boot.

In a development of the invention, the storage container is loaded via a restoring means, in particular a spring, which forces the supporting surface in the direction of the frame. A dead weight of an object causes the storage container to be loaded counter to a restoring force of the restoring means, and therefore the side surface is deformed and the storage container enlarged. By contrast, if objects are not inserted, the supporting surface is forced in the direction of the frame on account of the restoring force, and therefore the storage container assumes a minimal size. The storage container is preferably open upward in its loading and/or unloading position. An object can thus be inserted into the storage container. Owing to the dead weight of the object, the storage container is enlarged, and therefore the object does not protrude beyond the opening of the boot and the storage container can be displaced back into its storage position. If the weight of the inserted object is not sufficient to enlarge the storage container, i.e. the object still protrudes beyond the storage container, then, in one embodiment, a further enlargement of the storage container is possible manually by a user. In another embodiment, the storage container is basically enlarged to its maximum size during a displacement into a loading and/or unloading position and/or on account of being loaded by inserted objects.

In one embodiment of the invention, the side wall is foldable and/or telescopic. According to one embodiment, the foldable side wall is designed with a plurality of folds and is foldable and extendable in accordance with the concertina principle. In one embodiment, the restoring means is formed as one or more springs which are incorporated, for example sewn in, along the side wall. In another embodiment, the side wall does not have any defined folds and is foldable loosely. The telescopic side wall can be formed integrally or as a number of pieces from a highly flexible material.

According to a development of the invention, the supporting surface can be connected to the frame via a linkage and can be moved at least between a first not-in-use position and a second use position. The linkage enables the storage container to be fixed in at least two sizes without a tool and in a simple manner.

In another embodiment, the side wall is formed by a roller blind with at least one winding shaft and a roller blind web which can be wound up and unwound about the winding shaft. In one embodiment, a restoring spring of an automatic winder of the roller blind can act on the supporting surface as a restoring means.

In a development of the invention, the supporting surface is essentially rectangular and the storage container comprises at least two mutually opposite synchronized roller blinds. The synchronization is possible via a simple belt drive, for example if the roller blinds are arranged in the same direction. In addition, it is conceivable to arrange the roller blinds mirror-symmetrically, with a converse direction of rotation, with a corresponding reversal of the direction of rotation taking place for the synchronization. In one embodiment, the roller blind webs of the opposite roller blinds are formed integrally, with it also being possible for the supporting surface situated between the side walls to be formed by the material of the roller blind webs.

In a further embodiment of the invention, two roller blinds which are adjacent to each other are synchronized via bevel gear pinions. According to one embodiment, roller blinds are arranged on all four sides of a storage container with a rectangular supporting surface and a rectangular frame and are synchronized with one another via bevel gear pinions.

In a further embodiment, the storage container comprises two roller blinds which are adjacent to each other and the roller blind webs of which have, at adjacent ends, complementary connecting means. By means of the connecting means, the corners of the storage container, which can be enlarged by unwinding the roller blind webs, can be closed. In one embodiment, the connecting means are designed as a zip fastener. Zip fasteners can be designed both with interengaging hooks and with corresponding grooves. The zip fasteners can be selected in such a manner that a liquid-tight connection is obtained. In another embodiment, the connecting means are, for example, press studs, touch and close fasteners or the like. Separation of the connection enables the roller blind webs each to be wound about the associated winding shaft in order to reduce the size of the storage container.

In a development of the invention, the supporting surface can be moved between a first not-in-use position and a second use position, and the adjacent roller blind webs can be linked to each other by a fixed linking means during a movement into the use position and can be released from each other during a movement into the not-in-use position. In the case of a zip fastener, the fixed linking means is, for example, a zip fastener slide which is arranged in a fixed position with respect to the frame. After separation, the roller blind webs can each be wound up about associated winding shafts.

According to a development of the invention, the roller blind web can be locked in at least one position. In one embodiment, the locking takes place, for example, by means of a locking segment on the winding shaft, into which segment a latch connected to the frame can engage such that rotation of the winding shaft is prevented. Release of the latch enables the winding shaft to be rotated. Owing to a restoring spring, it can rotate in a direction for winding up the roller blind web or, for example owing to a force applied by a user and/or an object, can rotate in a direction for unwinding the roller blind web. According to one embodiment, the locking segment and the latch interact as a ratchet drive. In this case, enlargement of the storage container, i.e. unwinding of the roller blind web, is possible, owing to an applied force, without being unlocked, but winding up of the roller blind web, i.e. a reduction in size of the storage container, is possible only by it being unlocked.

In a further embodiment, the side wall and the supporting surface are formed integrally. The integral formation makes visually attractive solutions without visible seams and simple manufacturing operations possible.

In a further embodiment, at least one side wall and/or the supporting surface can be reinforced by at least one insert panel. The side wall and/or the supporting surface are composed, for example, of fabric. The side wall is highly flexible and, as a result, can easily be deformed, for example can be rolled about a winding shaft or can be folded in accordance with the concertina principle. In order, if the side wall is highly flexible, nevertheless to obtain high strength for the storage container in the use position, insert panels, for example an insert base made of wood or plastic, can be used in order to reinforce the storage container.

In a development of the invention, the insert panel is foldable. An insert panel for a side wall is arranged, for example, in a manner bearing against the supporting surface and can be deployed by a user when the need arises such that the storage container is reinforced.

In a further embodiment, the insert panel is arranged pivotably on the supporting surface. The insert panel can be pivoted, for example by a user, when the need arises from a position parallel to the supporting surface in the direction of the side walls in order to reinforce the storage container. In another embodiment, pivoting takes place automatically owing to a force, for example a spring force.

In a further embodiment, the storage container can be locked at least in the storage position against moving into the loading and/or unloading position. In one configuration, the latch mechanism comprises a lever which engages under part of the body and/or into another mating element for locking purposes. The lock can be released by pivoting of the lever. In one configuration, pivoting of the lever can be blocked by a lock.

In a further embodiment, the frame is mounted, in particular is mounted displaceably, in a support and/or on guide rails via a push-push connection. The push-push connection referred to here is an opening and/or locking system which is triggered by slight pressing on the frame and/or an actuating element, in particular an actuating button. A lock can be released by slight pressing on a storage container, which is in the storage position, counter to a direction into the loading and/or unloading position. Locking can likewise also be triggered by pressing on a storage container which is already in the storage position. As an alternative, rather than pressing the storage container, only an actuating element is pressed. A mechanism necessary for this purpose is similar to a ball point pen mechanism. The unlocked storage container is preferably moved automatically into the loading and/or unloading position. In one configuration, a spring which forces the storage container into the loading and/or unloading position is provided for this purpose.

The object is furthermore achieved by a module, comprising a support in which a frame is movably mounted, it being possible for a storage container to be arranged in the support. The frame is preferably mounted in the support by means of a push-push connection. According to one embodiment, the frame is mounted displaceably in the support.

Any desired storage container can be arranged in the frame. The module can thus be fastened in a motor vehicle, for example under a rear parcel shelf, and the motor vehicle can be matched to certain fittings and/or model series by use of an associated storage container.

Further advantages and features of the invention emerge from the description below of exemplary embodiments of the invention which are illustrated in the drawings. Uniform reference numbers are used for identical components.

DETAILED DESCRIPTION

Figure 1:
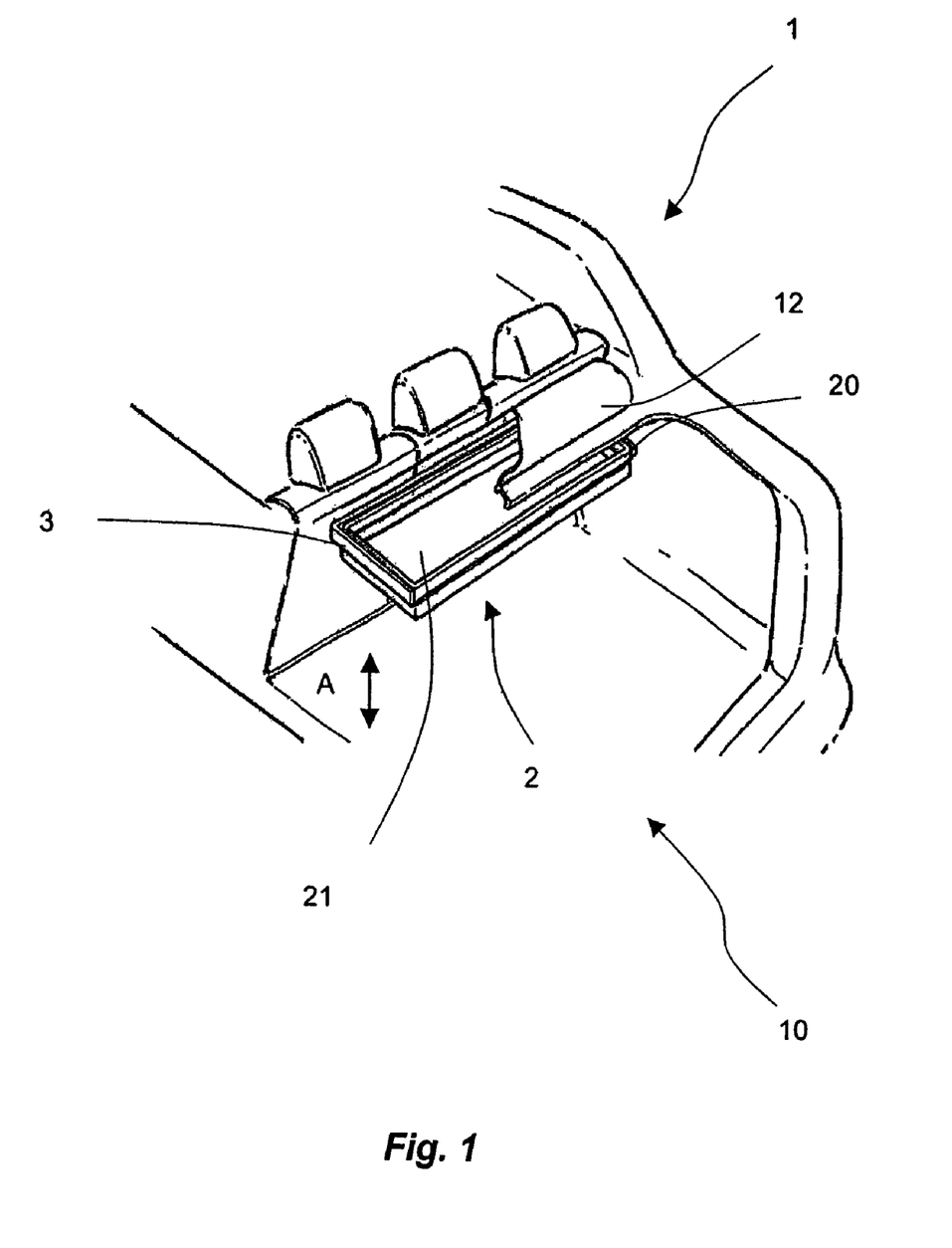
FIG. 1 shows a schematic illustration of a motor vehicle with a storage container according to the invention in a storage position.
Figure 2:
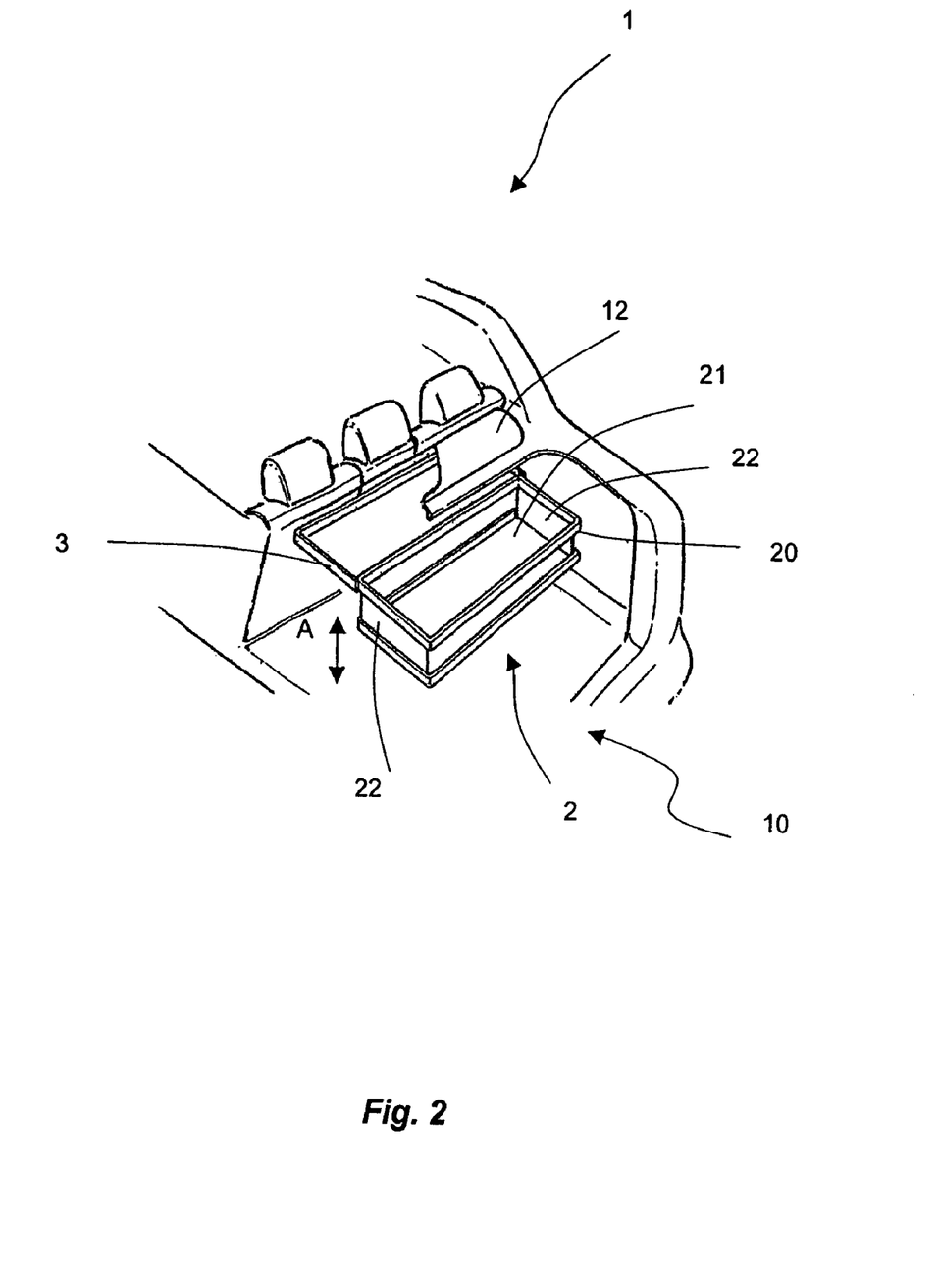
FIG. 2 shows a schematic illustration of the motor vehicle according to FIG. 1 with the storage container in a loading and unloading position.

FIG. 1 and FIG. 2 show schematically a partially cut away motor vehicle 1 with a loading area 10 and a storage container 2 which is fastened on the lower side of a rear parcel shelf 12. The storage container 2 illustrated can be displaced in relation to a support 3, which is arranged fixedly on the motor vehicle 1, between a first position, which is illustrated in FIG. 1 and is referred to below as the storage position, and a second position, which is illustrated in FIG. 2, for, loading and/or unloading, the loading and unloading position. The storage container 2 comprises a frame 20 and a supporting surface 21. In the embodiment illustrated, the supporting surface 21 is connected to the frame 20 via two side walls 22 which are visible in FIG. 2. As is apparent from FIGS. 1 and 2, the height of the storage container can be varied. According to the invention, the side walls 22 can be deformed for this purpose in such a manner that the supporting surface can be moved along the direction A, which is illustrated by an arrow, between a not-in-use position illustrated in FIG. 1 and a use position illustrated in FIG. 2.

According to one embodiment, the supporting surface 21 moves automatically into the use position illustrated in FIG. 2 during displacement of the storage container 2 from the storage position illustrated in FIG. 1 into the loading and unloading position illustrated in FIG. 2. In a further embodiment, the supporting surface 21 initially remains in the not-in-use position illustrated in FIG. 1 even during movement of the storage container into the loading and unloading position illustrated in FIG. 2. In such an embodiment, the supporting surface 21 is moved into the use position illustrated in FIG. 2 only by an object (not illustrated) being deposited on it. The storage container which is loaded by an object maintains its height illustrated in FIG. 2 even as the storage container is displaced back relative to the support 3 into the storage position illustrated in FIG. 1.

The storage container 2 reaches essentially over the entire width of an opening of the boot 10. In other embodiments, two storage containers are arranged next to each other and/or a smaller storage container is provided.

Figure 3:
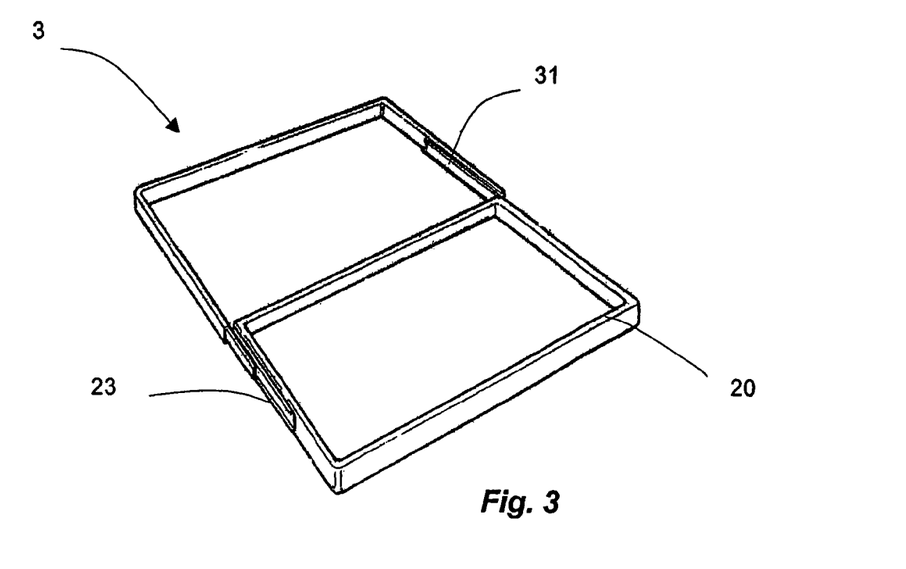
FIG. 3 shows a module for a storage container.

FIG. 3 shows schematically a module for a storage container, comprising a support 3 and a frame 20. Guide rails 23 which interact with longitudinal guides 31 arranged on the support 3 are arranged on the frame 20. In the embodiment illustrated, the frame 20 is connected to the support 3 via a push-push connection, and therefore, by slight pressing on the frame 20 in the direction of the support 3, the frame 20 is locked and/or unlocked in relation to the support. Extension of the frame 20 into the loading and unloading position can be assisted, for example, by a spring force or a similar element. Any desired storage compartments can be inserted into the module illustrated in FIG. 3. Storage containers according to the invention, comprising one or more deformable side walls, are preferably inserted into the module. However, other storage containers can also be inserted into the module illustrated. The module thus permits good adaptability to various fittings variants or vehicle models with some identical components being used.

In other embodiments, a storage container according to the invention can be mounted rotatably and/or pivotably in the motor vehicle via bearing devices (not shown). Bearing devices of this type are preferably likewise of modular construction, and therefore different storage containers can be inserted on identically constructed bearing devices.

Figure 4:
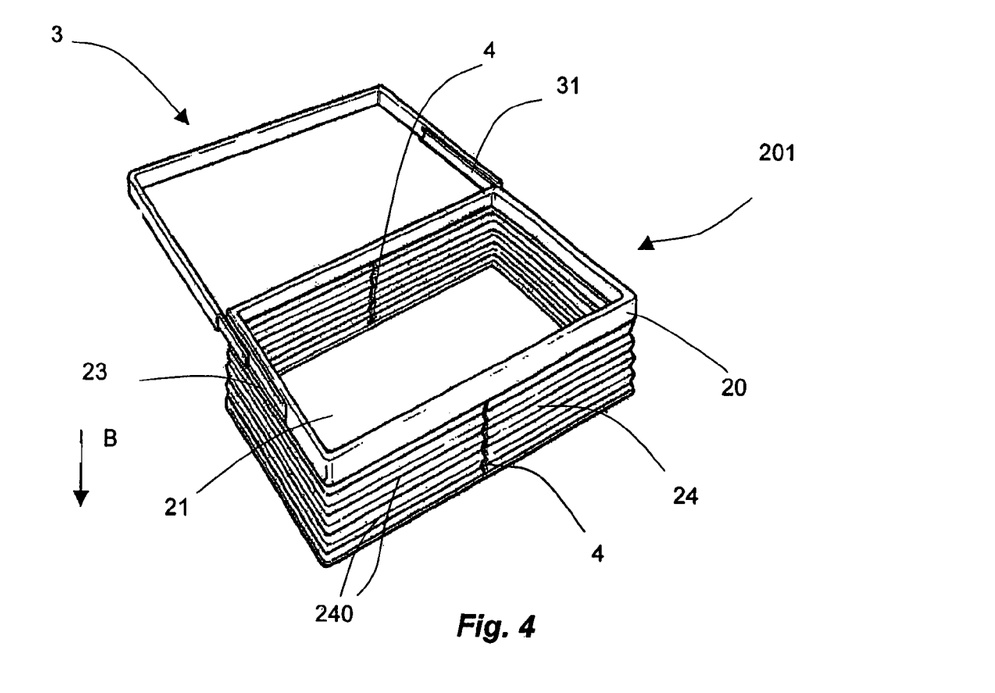
FIG. 4 shows an embodiment of a storage container according to the invention with a foldable side wall.

FIG. 4 shows an embodiment of a storage container 201 according to the invention, comprising the frame 20, the supporting surface 21 and four deformable side walls 24. In the embodiment illustrated, the four side walls 24 are produced integrally from a material web. The side walls 24 are foldable along defined folds 240 in accordance with the concertina or bellows principle. In the embodiment illustrated, two side walls 24 are reinforced by springs 4. The springs 4 force the supporting surface 21 counter to the direction B, illustrated by the arrow, in the direction of the frame 20. The dead weight of an object (not illustrated) which can be inserted into the storage container 201 causes the side walls 24 to be unfolded counter to the spring force of the springs 4, and therefore the supporting surface 21 is displaced in the direction of the arrow B and, as a result, the storage space of the storage container 201 is enlarged. In another embodiment, the storage container 201 is locked in a folded not-in-use position by a suitable element and can be unlocked when the need arises by a user.

The storage container 201 illustrated can be displaced in relation to the support 3. In other embodiments, the storage container has a round supporting surface and is mounted rotatably about an essentially vertical axis.

Figure 5:
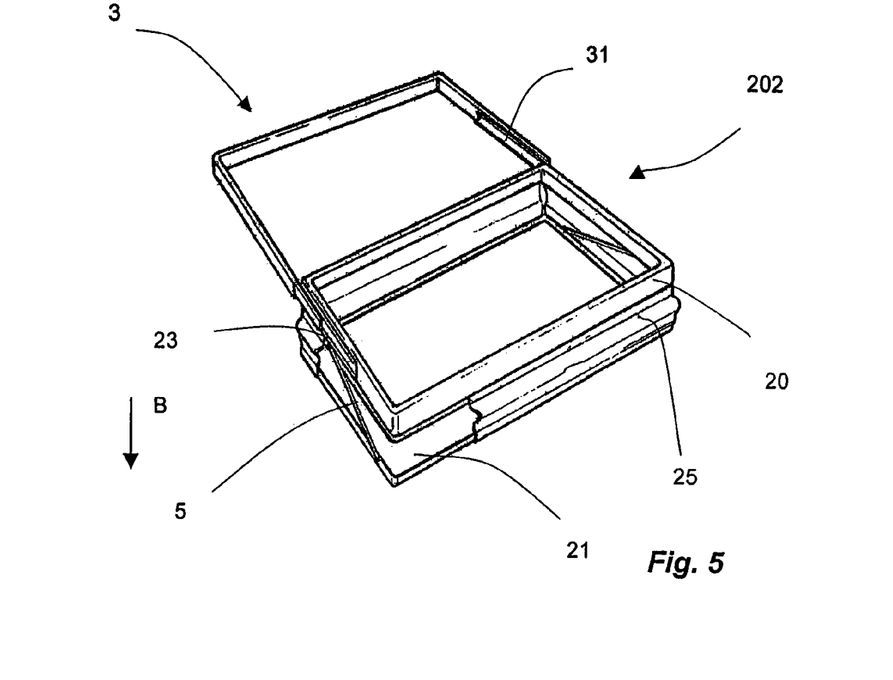
FIG. 5 shows a further embodiment of a storage container according to the invention with a foldable side wall.

FIG. 5 shows a further embodiment of a storage container 202 according to the invention which is mounted displaceably on the support 3. The storage container 202 comprises the frame 20 and the supporting surface 21. The frame 20 and the supporting surface 21 are connected via four deformable side walls 25. The four side walls 25 can be produced integrally from a material web. In FIG. 5, two side walls 25 are partially cut away in order to make a linkage 5 visible. The connection between the supporting surface 21 and the frame 20 is reinforced via the linkage 5. The supporting surface 21 can be moved along the direction B between a not-in-use position and a use position. The supporting surface 21 can preferably be fixed in a not-in-use position and a use position by the linkage 5. The linkage 5 is independent of the choice of a side wall. Thus, a linkage 5 is conceivable, for example even in the case of an embodiment with a side wall which is foldable in accordance with the concertina principle, as per FIG. 4.

Figure 6:
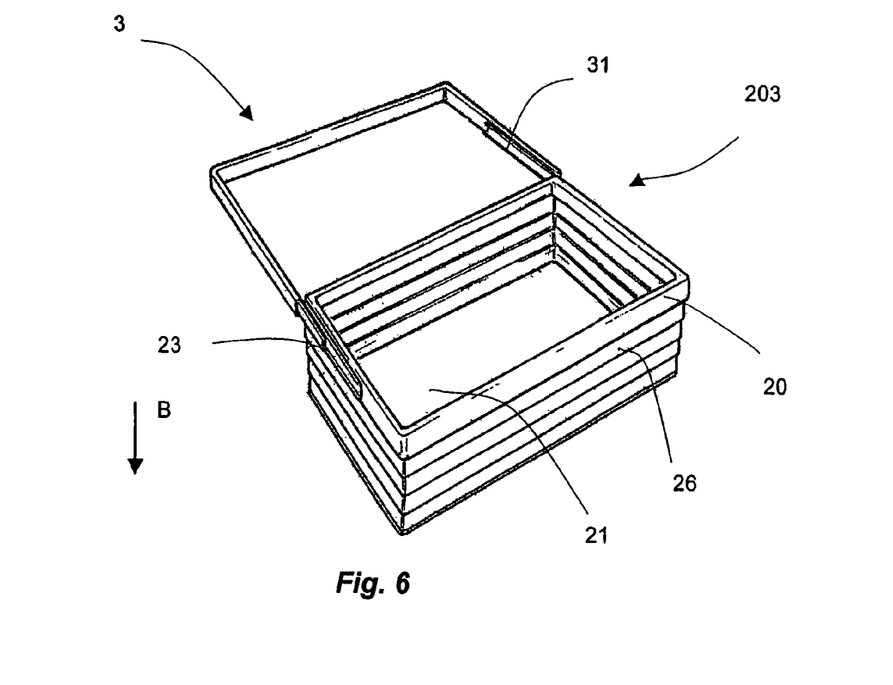
FIG. 6 shows an embodiment of a storage container according to the invention with a telescopic side wall.

FIG. 6 shows a further embodiment of a storage container 203 which, in the embodiment illustrated, is likewise mounted displaceably on the support 3. In the embodiment according to FIG. 6, the frame 20 and the supporting surface 21 are connected to each other via a telescopic side wall 26. The storage container 203 with the telescopic side wall 26 is shown in FIG. 6 in a use position of the supporting surface 21 and can be reduced in size by movement of the supporting surface 21 counter to the direction B illustrated. The telescopic side wall 26 can be designed integrally or in a number of pieces.

Figure 7:
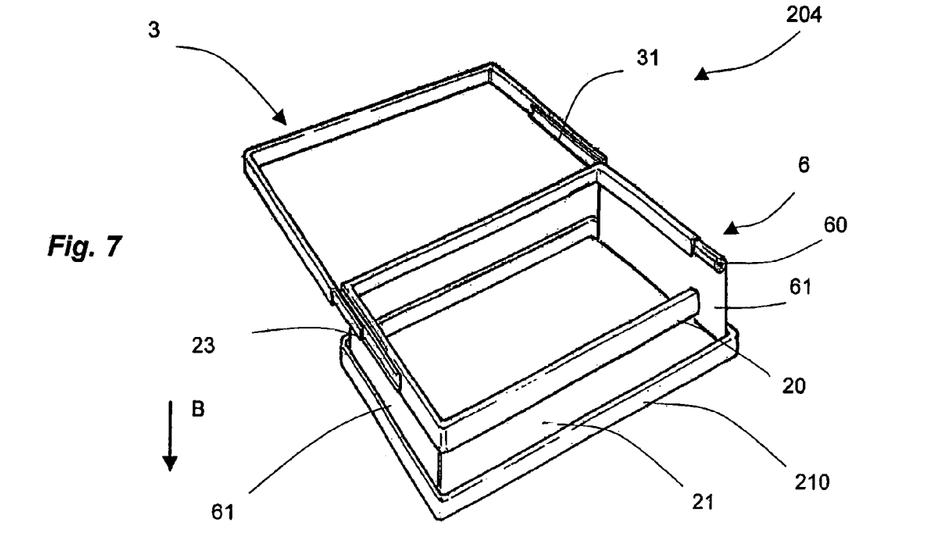
FIG. 7 shows an embodiment of a storage container according to the invention with two opposite roller blinds.

FIG. 7 shows a further embodiment of a storage container 204 mounted displaceably on the support 3, with the frame 20 being partially cut away. In this embodiment, winding shafts 60 of two opposite roller blinds 6 are arranged in the frame 20. Roller blind webs 61 can be wound up and unwound in each case on the winding shafts 60. It is likewise conceivable to arrange the winding shaft 60 on the supporting surface 21. The arrangement illustrated makes it possible to use, for both roller blinds 6, a common roller blind web 61, the ends of which are fastened to the two winding shafts 60. In this embodiment, the supporting surface 21 has an edge 210 in order to prevent inserted objects from dropping out on the free sides. Unwinding of the roller blind webs 61 from the respective winding shaft 60 causes the supporting surface 21 to be moved in the direction B illustrated by the arrow and the storage space of the storage container 204 is thus enlarged. Winding of the roller blind webs 61 onto the winding shafts 60 causes the supporting surface 21 to move counter to the direction B and the storage container 204 is reduced in size.

Figures 8, 9:
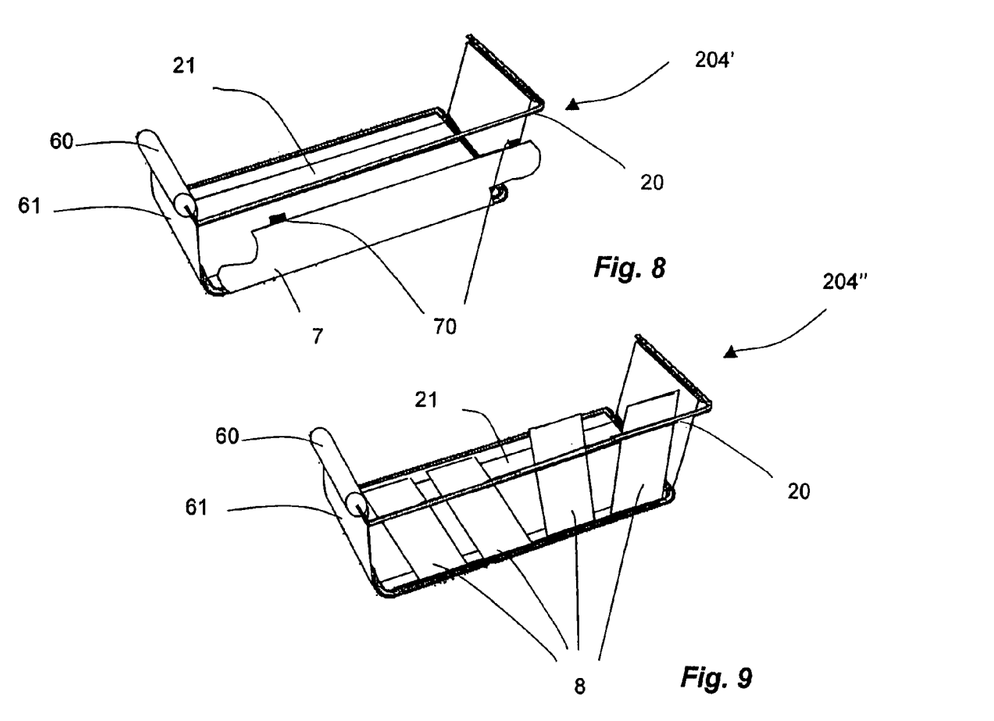
FIG. 8 shows a first variant of the embodiment according to FIG. 7.
FIG. 9 shows a second variant of the embodiment according to FIG. 7.

FIGS. 8 and 9 show variants 204', 204" of the storage container 204, illustrated in FIG. 7, without an edge of the supporting surface 21.

The storage container 204' illustrated in FIG. 8 comprises, in addition to the opposite roller blinds 6, a further flexible side wall 7 which can be fastened by a user to the frame 20 via hooks 70 in order to improve the stability. In the illustration, the frame 20 is designed as bent round material on which, for example, the winding shafts 60 can be mounted. The round material can be covered by a corresponding lining, and therefore the storage container 204' can also be inserted into the module illustrated in FIG. 3.

FIG. 9 shows a storage container 204", comprising two roller blinds and a third side wall which is constructed by pivoting insert panels 8. Clips (not illustrated), for example, by means of which the insert panels 8 can be connected to the frame 20 are arranged on the insert panels 8. The insert panels 8 can project over the frame 20, as illustrated. However, they preferably do not project beyond the frame 20, and therefore the height of the storage container 204" is independent of the pivoting of the insert panels 8 and the storage container 204" can be inserted into the module according to FIG. 3.

In the embodiments according to FIGS. 8 and 9, the roller blind webs 61 are produced from a material web and thus also form the supporting surface 21. The supporting surface 21 can be reinforced by an insert base (not illustrated), for example made of wood or plastic.

Figure 10:
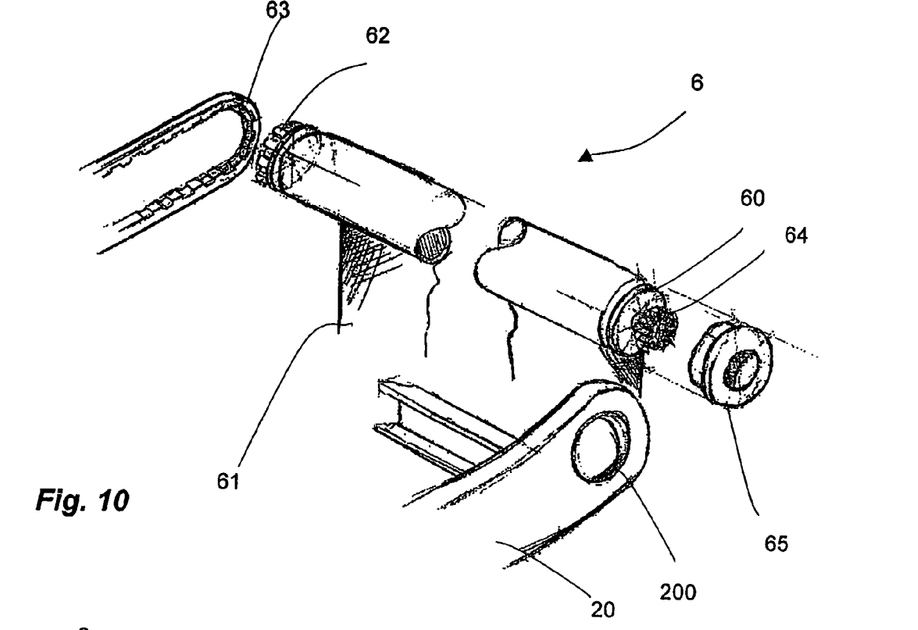
FIG. 10 shows a detailed view of the embodiment according to FIG. 7.

FIG. 10 shows schematically an exploded illustration of a detail of the storage container 204 according to FIG. 10, with only one of the two roller blinds 6 being visible in FIG. 10. The winding shafts 60 of the roller blinds 6 are each designed with a pinion 62 and are synchronized via a belt 63. By means of a parallel arrangement of the two roller blinds 6 with the same direction of rotation of the winding shafts 60, simple synchronization is directly possible via a belt 63. The winding shaft 60 is furthermore designed with a locking segment 64. A pushbutton 65 arranged in a rotationally fixed manner in an opening 200 of the frame 20 engages in the locking segment 64 and thus prevents rotation of the winding shaft 60. By actuation of the pushbutton 65 by a user, the rotationally fixed connection of the pushbutton 65 with the frame 20 is released. As a result, the winding shaft 60 is rotatable about its axis. After release of the lock, the roller blind web 61 is wound up onto the winding shaft 60 by a restoring spring (not illustrated), for example a known automatic winder. The roller blind web 61 is unwound from the winding shaft 60 by insertion of an object into the storage container 204, the weight of which object is greater than the force of the restoring spring. In a preferred embodiment, the locking segment is designed as a ratchet drive, with it being possible for the roller blind web 61 to be unwound owing to a weight without unlocking taking place via the pushbutton 65 whereas the roller blind web 61 can be wound up onto the winding shaft 60 only by unlocking taking place.

Figure 11:
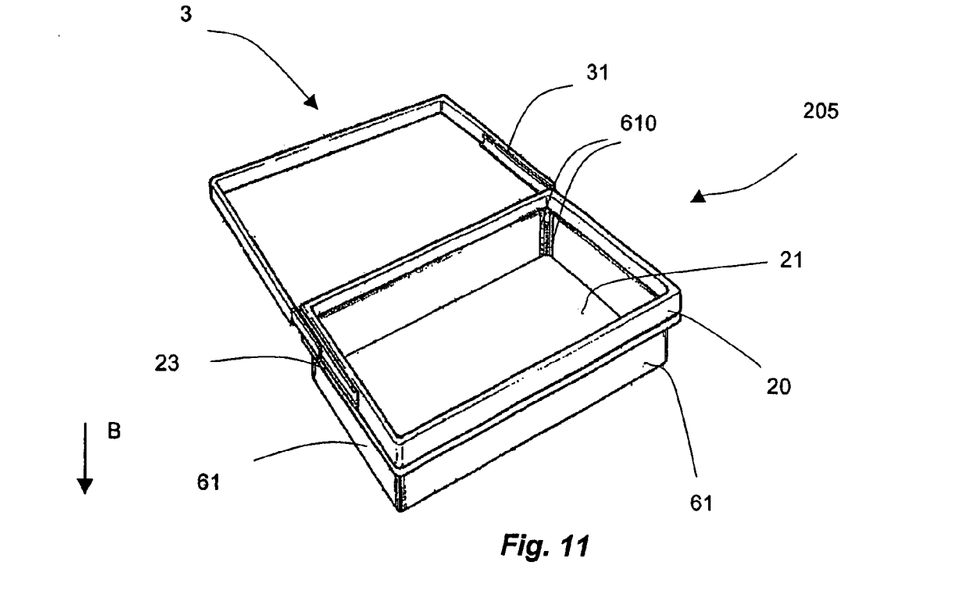
FIG. 11 shows an embodiment of a storage container according to the invention with four roller blinds.

FIG. 11 shows a further embodiment of a storage container 205 which is mounted displaceably on the support 3. In the case of the storage container 205, the supporting surface 21 and the frame 20 are connected to each other via four roller blinds 6 which are arranged on the four side surfaces of the storage container 205. In this case, the winding shafts 60 (not visible in FIG. 11) of the roller blinds 6 are arranged in the frame 20. The roller blind webs 61 can be connected to one another at the ends 610 adjacent to one another via a zip fastener. This provides a closed storage container.

Figure 12:
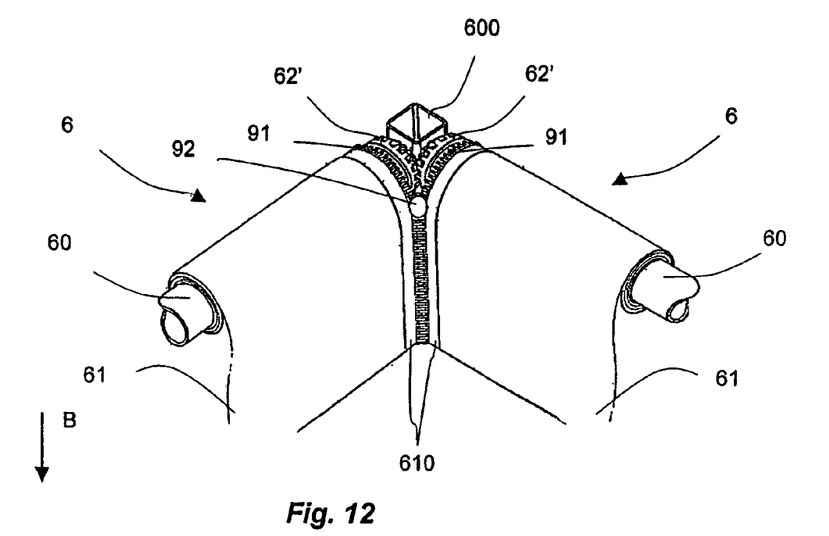
FIG. 12 shows a detailed view of the embodiment according to FIG. 11.
Figure 13:
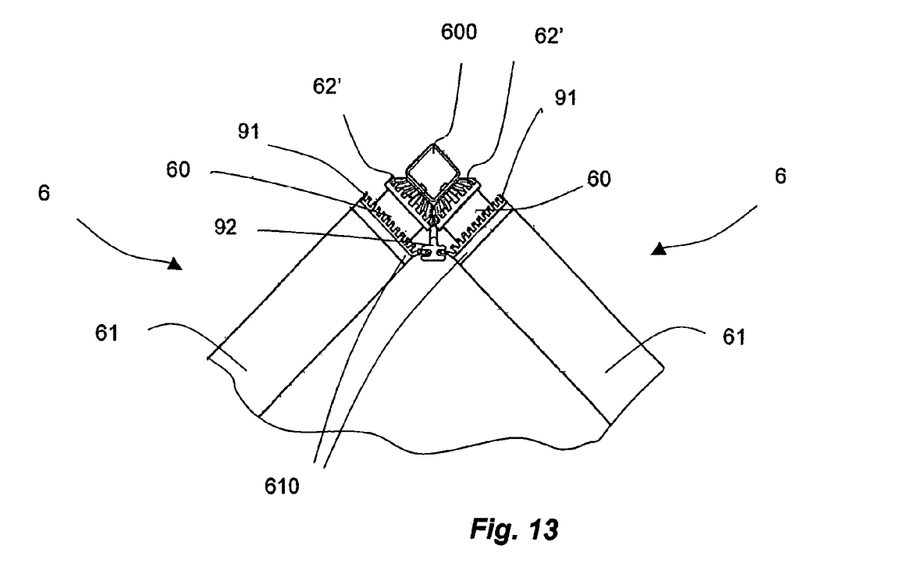
FIG. 13 shows a plan view of the detailed view according to FIG. 12.

FIGS. 12 and 13 show partially cut away detailed views of the storage container 205 according to FIG. 11. FIG. 12 shows a perspective view of two adjacent roller blinds 6 and FIG. 13 a plan view of the detailed view according to FIG. 12. The winding shafts 60, which are adjacent to each other, of the roller blinds 6 are synchronized with each other via bevel gear pinions 62'. The winding shafts 60 are mounted on a holder 600. Mutually complementary hooks 91 of a zip fastener are arranged at the ends 610 of the roller blind webs 61 adjacent to each other. A zip fastener slide 92 is mounted in a fixed position with respect to the frame 20 (not illustrated in FIG. 12), for example on the holder 600.

By means of the positionally fixed arrangement of the zip fastener slide 92, the mutually complementary hooks 91 of the zip fastener at the ends 610 of the roller blind web 61 are interlocked during a movement of the supporting surface 21 along the direction B (illustrated by an arrow), i.e. during unwinding of the roller blind web 61. During a movement in the opposite direction, the ends 610 of the roller blind web 61 are released from each other and the roller blind webs 61 can thus each be wound up onto the associated winding shaft 60.

Instead of the illustrated zip fastener with hooks 91, zip fasteners with interengaging grooves can likewise be used. In one embodiment, the zip fastener is coated, and therefore the storage container can be closed in a watertight manner by the zip fastener.

Figure 14:
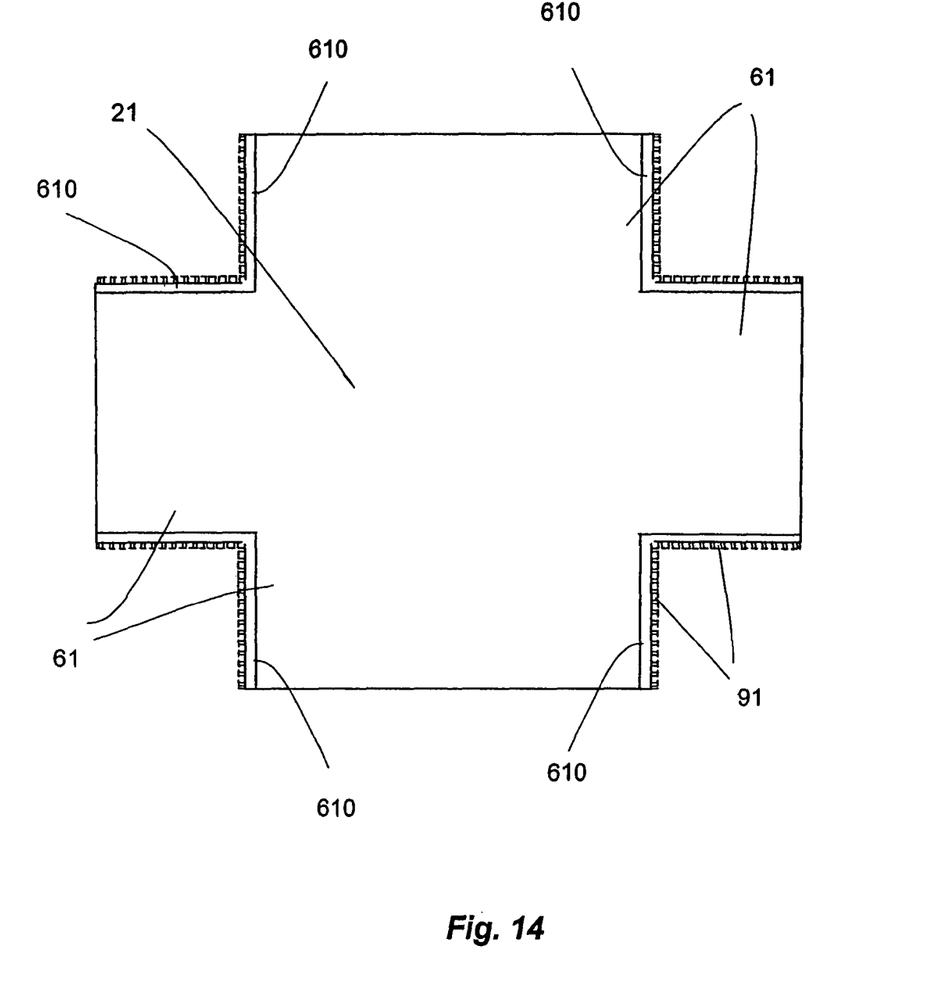
FIG. 14 shows a schematic illustration of a fabric web for use for an embodiment according to FIG. 11.

The roller blind web 61 and the supporting surface 21 are preferably formed integrally. FIG. 14 shows schematically a pattern for an embodiment of this type. The roller blind webs 61 are each adjacent to an edge of the supporting surface 21. The free edges 610 of the roller blind webs 61 are designed with mutually complementary hooks 91.

In such an embodiment of the storage container 205 according to FIGS. 11 to 13, the supporting surface 21 is preferably reinforced by an insert base.

In the embodiments illustrated, the frame 20 and the supporting surface 21 are each rectangular. However, other shapes are also conceivable. In particular in the case of embodiments in which the storage container is mounted pivotably rather than displaceably, differing shapes may be advantageous.

Figure 15:
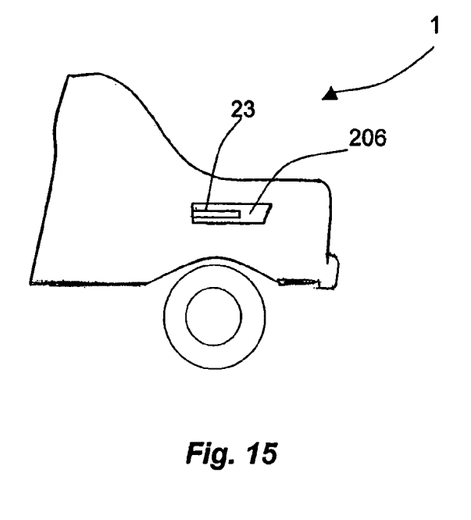
FIG. 15 shows, a schematic side view of a motor vehicle rear with a storage container in the storage position.
Figure 16:
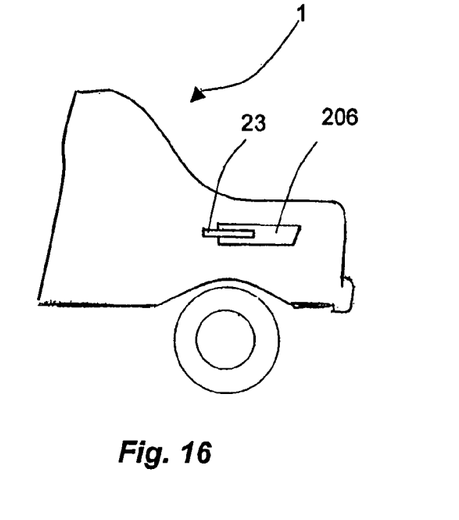
FIG. 16 shows a schematic side view of the motor vehicle rear according to FIG. 15, with the storage container located in the loading and/or unloading position.
Figure 17:
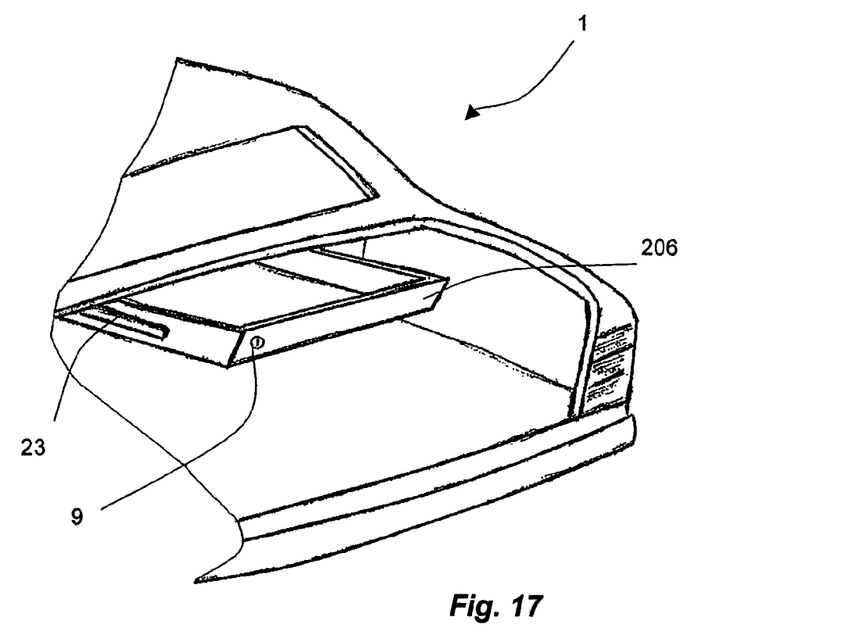
FIG. 17 shows a perspective illustration of the motor vehicle rear according to FIG. 16.
Figure 18:
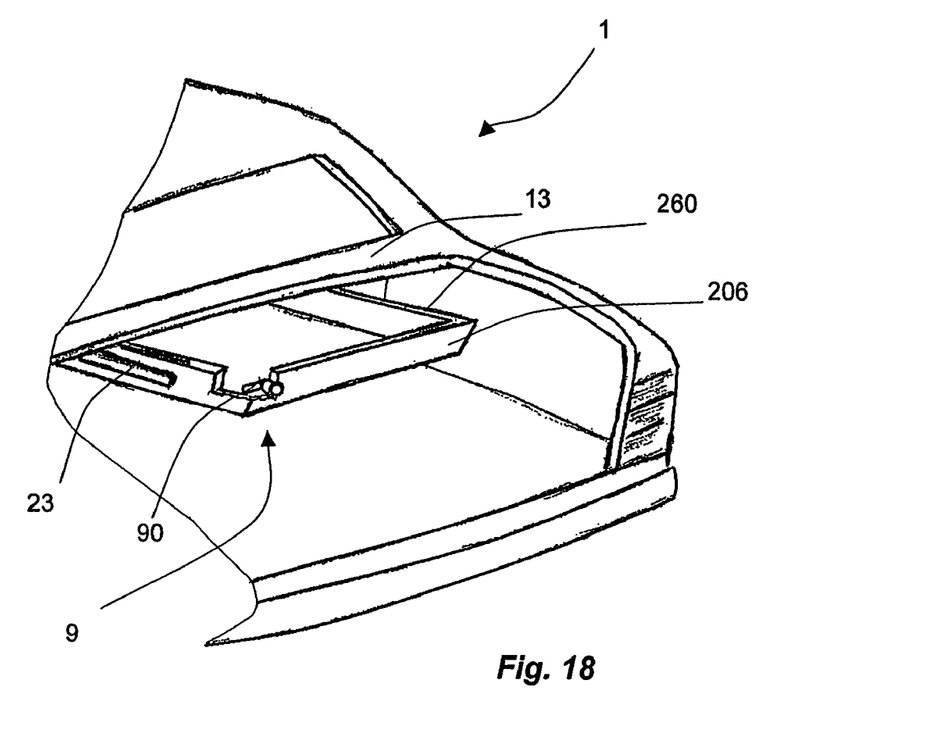
FIG. 18 shows a partially cut away, perspective illustration according to FIG. 17.

FIGS. 15 to 18 show schematically a rear of a motor vehicle 1 with a storage container 206 according to a further exemplary embodiment of the invention. FIGS. 15 and 16 show a schematic side view. FIGS. 17 and 18 show the rear in a perspective illustration. The storage container 206 is mounted displaceably in the motor vehicle 1 via guide rails 23 (illustrated schematically), the storage container 206 being displaceable between a storage position, illustrated in FIG. 15, and the loading and/or unloading position, illustrated schematically in FIGS. 16, 17 and 18. In the case of the storage container 206, side walls and a frame are formed integrally with one another, with a height of the storage container 206 being changeable, for example, by means of a telescopic design of the side walls according to FIG. 6. In other configurations, the side wall of the storage container 206 is designed, for example, as a foldable side wall.

FIG. 17 shows schematically the rear of the motor vehicle 1 according to FIG. 16, the storage container 206 being situated, as illustrated in FIG. 16, in the loading and/or unloading position. The storage container 206 has a latching mechanism 9 by means of which the storage container can be locked in the storage position, illustrated in FIG. 15, against a movement into the loading and/or unloading position according to FIGS. 16 to 18.

FIG. 18 shows the motor vehicle 1 according to FIG. 17, the storage container 206 being partially cut away such that the latching mechanism 9 can be better seen. As illustrated in FIG. 18, the latching mechanism 9 shown comprises a lever 90 which can be brought by pivoting from an unlocking position, which is illustrated in FIG. 18 and in which the lever 90 does not protrude over an upper edge 260 of the storage container 206, into a locking position, in which the lever protrudes over the upper edge 260. In this case, when the storage container 206 is in the storage position according to FIG. 15, the lever 90 can engage in its locking position behind corresponding elements of a motor vehicle body 13, and therefore a displacement of the storage container 206 from the storage position illustrated in FIG. 15 into the loading and/or unloading position illustrated in FIGS. 16 to 18 is blocked.

Figure 19:
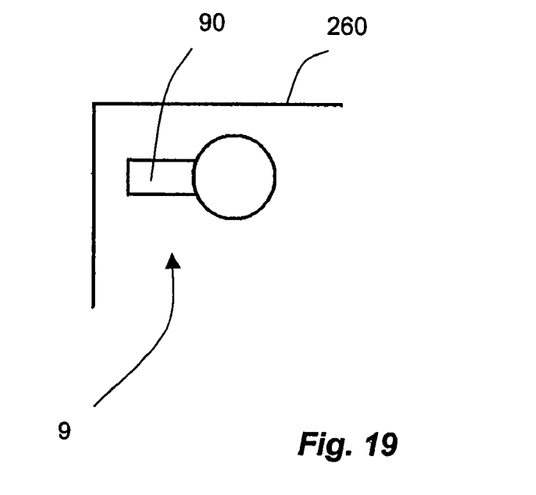
FIG. 19 shows a schematic illustration of a locking mechanism for a storage container according to FIG. 15 in an unlocking position.
Figure 20:
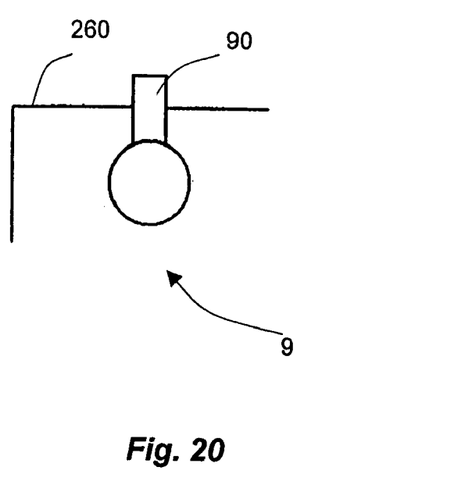
FIG. 20 shows a schematic illustration of the locking mechanism according to FIG. 20 in a locking position.

FIGS. 19 and 20 show schematically the latching mechanism 9, with the lever 90, in the illustration according to FIG. 19, being in an unlocking position and, in the illustration according to FIG. 20, being in a locking position which is offset by 90° with respect to the unlocking position according to FIG. 19. In other configurations, other pivoting angles are conceivable, with the lever not protruding over the upper edge 260 of the storage container in an unlocking position and, in a locking position, protruding over the upper edge 260 such that it can engage in corresponding mating means. The latching mechanism 9 may comprise a lock, with rotation of a key introduced into the lock being converted directly into) a rotation of the lever 90. In other configurations, the latching mechanism 9 is designed in such a manner that pressing on the latching mechanism 9, in particular on an actuating button, causes rotation of the lever 90. In this case, a lock which electronically and/or mechanically prevents actuation of the latching mechanism can likewise be provided.

The invention claimed is:

1. A storage container for use in a boot of a motor vehicle, said storage container being fastenable on a lower side of a rear parcel shelf and movable into a loading or unloading position, said storage container comprising:
   a frame;
   a supporting surface which is essentially rectangular; and
   an essentially inelastic side wall structure disposed to connect said supporting surface to said frame, said side wall structure comprising a first roller blind and a second roller blind disposed adjacent said first roller blind and synchronized with said first roller blind by cooperating bevel gear pinions, said first roller blind including a winding shaft and a roller blind web, said roller blind web being supported on said winding shaft such that said roller blind web can be wound up on said winding shaft and unwound from said winding shaft to vary a height of said side wall structure, said roller blind web and said supporting surface together defining a storage space configured for storing articles within said storage container.

2. The storage container of claim 1, wherein the height of said side wall structure is defined between upper and lower edges of said side wall structure, and winding said roller blind web on said winding shaft and unwinding said roller blind web from said winding shaft vary the height of said side wall structure to adjust a volume of said storage space.

3. The storage container of claim 1, wherein said winding shaft includes a locking element disposed to prevent rotation of said winding shaft and lock said winding shaft in at least one winding position.

4. The storage container of claim 1, wherein said roller blind web and said supporting surface are formed integrally with one another.

5. The storage container of claim 1 including at least one insert panel disposed to reinforce one of: said side wall structure and said supporting surface.

6. The storage container of claim 1 including a restoring element disposed to force said storage container in a direction of said frame.

7. A storage container for use in a boot of a motor vehicle, said storage container being fastenable on a lower side of a rear parcel shelf and movable into a loading or unloading position, said storage container comprising:
   a frame;
   a supporting surface; and
   an essentially inelastic side wall structure disposed to connect said supporting surface to said frame, said side wall structure comprising a first roller blind and a second roller blind disposed adjacent said first roller blind, said first roller blind including a first winding shaft and a first roller blind web, said first roller blind web being supported on said first winding shaft such that said first roller blind web can be wound up on said first winding shaft and unwound from said first winding shaft to vary a height of said side wall structure, said first roller blind web and said supporting surface together defining a storage space configured for storing articles within said storage container, said second roller blind having a second winding shaft and a second roller blind web supported on said second winding shaft, wherein adjacent edges of the adjacent respective said first and second roller blind webs comprise complementary sides of a zip fastener.

8. The storage container of claim 7, wherein said supporting surface is movable between a first not-in-use position and a second use position, and said storage container includes a linking element which is fixed relative to said frame, said first and second roller blind webs being linked to one another by said linking element during movement of said supporting surface into the use position and being released from one another during movement of said supporting surface into the not-in-use position.

9. A storage container for use in a boot of a motor vehicle, said storage container being fastenable on a lower side of a rear parcel shelf and movable into a loading or unloading position, said storage container comprising:
a frame;
a supporting surface;
an essentially inelastic side wall structure disposed to connect said supporting surface to said frame, said side wall structure comprising a first roller blind and a second roller blind, said first and second roller blinds being disposed in opposite and substantially parallel relationship with one another, said first roller blind including a first winding shaft and a first roller blind web, said first roller blind web being supported on said first winding shaft such that said first roller blind web can be wound up on said first winding shaft and unwound from said first winding shaft to vary a height of said side wall structure, said second roller blind including a second winding shaft and a second roller blind web supported on said second winding shaft such that said second roller blind web can be wound up on said second winding shaft and unwound from said second winding shaft to vary a height of said side wall structure, said first and second roller blind webs of said first and second roller blinds and said supporting surface together defining a storage space configured for storing articles within said storage container, each of said first and second winding shafts mounting thereon a pinion; and
a belt interconnecting said pinions to one another to synchronize movement of said first and second roller blinds with one another.

10. The storage container of claim 9, wherein said supporting surface and said frame are substantially rectangular, said first and second roller blinds are disposed in spaced apart and substantially parallel relationship with one another at opposite ends of said supporting surface with said supporting surface extending between lower portions of said first and second roller blind webs, said first and second roller blinds interconnecting said supporting surface to said frame.

11. A storage container for use in a boot of a motor vehicle, said storage container being fastenable on a lower side of a rear parcel shelf and movable into a loading or unloading position, said storage container comprising:
a frame;
a supporting surface;
an essentially inelastic side wall structure disposed to connect said supporting surface to said frame, said side wall structure comprising a first roller blind and a second roller blind, said first and second roller blinds being disposed adjacent one another, said first roller blind including a first winding shaft and a first roller blind web, said first roller blind web being supported on said first winding shaft such that said first roller blind web can be wound up on said first winding shaft and unwound from said first winding shaft to vary a height of said side wall structure, said second roller blind including a second winding shaft and a second roller blind web supported on said second winding shaft such that said second roller blind web can be wound up on said second winding shaft and unwound from said second winding shaft to vary a height of said side wall structure, said first and second roller blind webs of said first and second roller blinds and said supporting surface together defining a storage space configured for storing articles within said storage container; and
a bevel gear pinion mounted on each of said first and second winding shafts, said bevel gear pinions being engaged with one another to synchronize movement of said first and second roller blinds with one another.

12. A storage container for use in a boot of a motor vehicle and being fastenable on a lower side of a rear parcel shelf and movable relative thereto into a loading or unloading position, said storage container comprising:
a frame;
a supporting surface;
a side wall arrangement connecting said supporting surface to said frame, said side wall arrangement and said supporting surface together defining an interior storage space configured and sized for storing articles therein, said side wall arrangement including a first roller blind and a second roller blind, said first roller blind and said second roller blind being substantially parallel to one another, said first roller blind having a first winding shaft and a first roller blind web connected to said first winding shaft, said second roller blind having a second winding shaft and a second roller blind web connected to said second winding shaft, each of said first and second winding shafts mounting thereon a pinion; and
a belt interconnecting said pinions to one another to synchronize movement of said first and second roller blinds with one another, wherein winding of said first and second roller blind webs onto the respective said first and second winding shafts decreases a height of said side wall arrangement, as defined between opposed upper and lower edge portions of said side wall arrangement, to decrease a volume of said storage space and unwinding of said first and second roller blind webs from the respective said first and second winding shafts increases the height of said side wall arrangement to increase the volume of said storage space, and said first and second roller blind webs are disposed in opposite and facing relationship with one another when unwound from the respective said first and second winding shafts.

13. A storage container for use in a boot of a motor vehicle and being fastenable on a lower side of a rear parcel shelf and movable relative thereto into a loading position or unloading position, said storage container comprising:
a frame;
a supporting surface; and
a side wall arrangement connecting said supporting surface to said frame, said side wall arrangement and said supporting surface together defining an interior storage space configured and sized for storing articles therein, said side wall arrangement including a first roller blind and a second roller blind, said first roller blind and said second roller blind being disposed adjacent one another in substantially perpendicular relationship, said first roller blind having a first winding shaft and a first roller blind web connected to said first winding shaft, said second roller blind having a second winding shaft and a second roller blind web connected to said second winding shaft, each of said first and second winding shafts mounting thereon a bevel gear, wherein winding of said first and second roller blind webs onto the respective said first and second winding shafts decreases a height of said side wall arrangement, as defined between opposed upper and lower edge portions of said side wall arrangement, to decrease a volume of said storage space and unwinding of said first and second roller blind webs from the respective said first and second winding shafts increases the height of said side wall arrangement to increase the volume of said storage space, said bevel gears being engaged with one another to synchronize movement of said first and second roller blinds with one another.

14. The storage container of claim 13, wherein said side wall arrangement includes third and fourth roller blinds each having a winding shaft and a roller blind web connected thereto, wherein winding of said first, second, third and fourth roller blind webs onto the respective said winding shafts decreases the volume of said storage space and unwinding of said first, second, third and fourth roller blind webs from the respective said winding shafts increases the volume of said storage space, said third and fourth roller blinds being disposed adjacent one another in substantially perpendicular relationship, said first and third roller blinds being substantially parallel to one another and disposed transversely between said second and fourth roller blinds and in substantially perpendicular relationship therewith, each said first, second, third and fourth winding shaft mounting thereon a bevel gear on each end thereof, said bevel gears of adjacent ones of said winding shafts being engaged with one another to synchronize movement of said first, second, third and fourth roller blinds with one another.

\* \* \* \* \*